Patented Mar. 22, 1927.

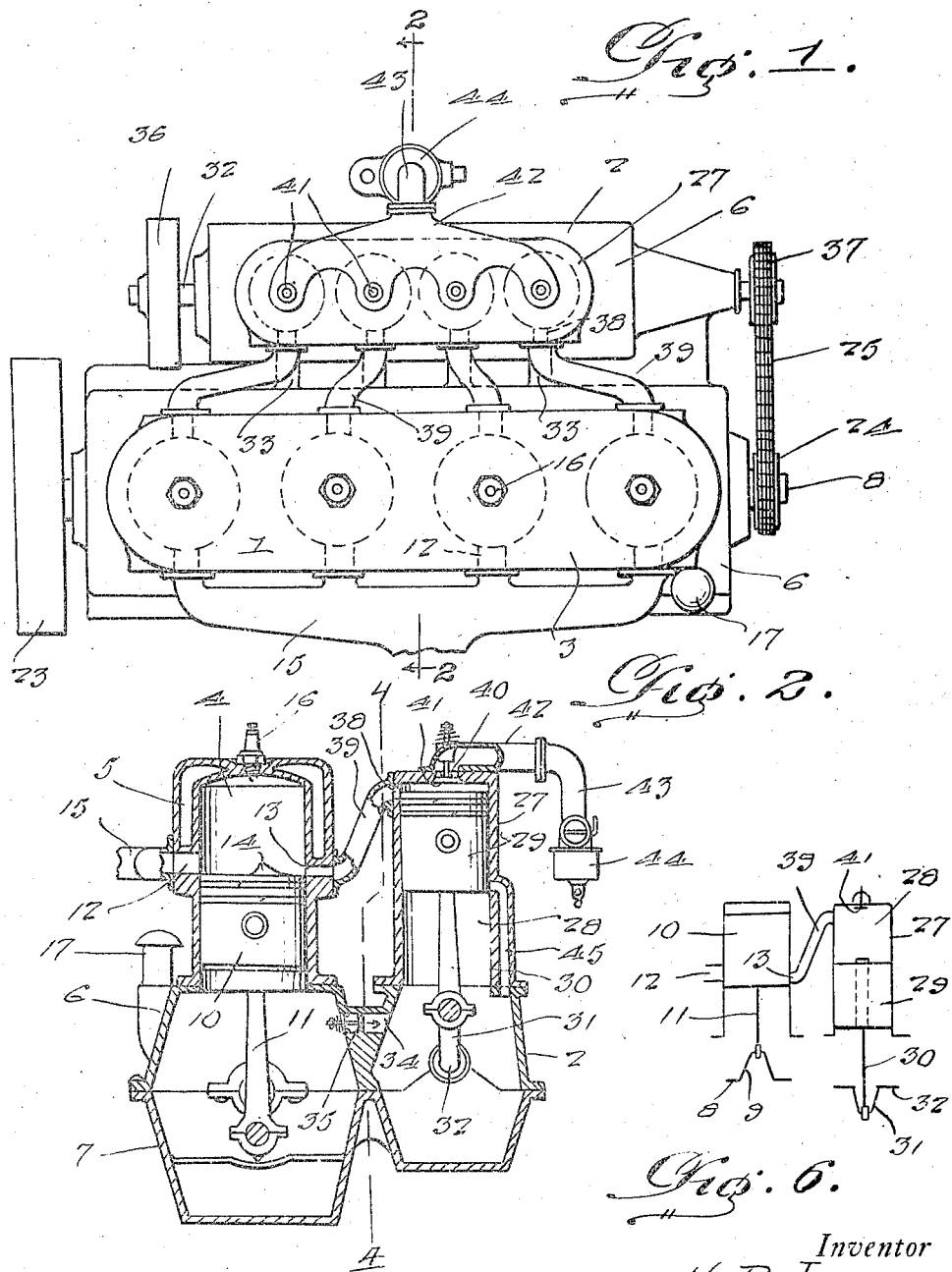

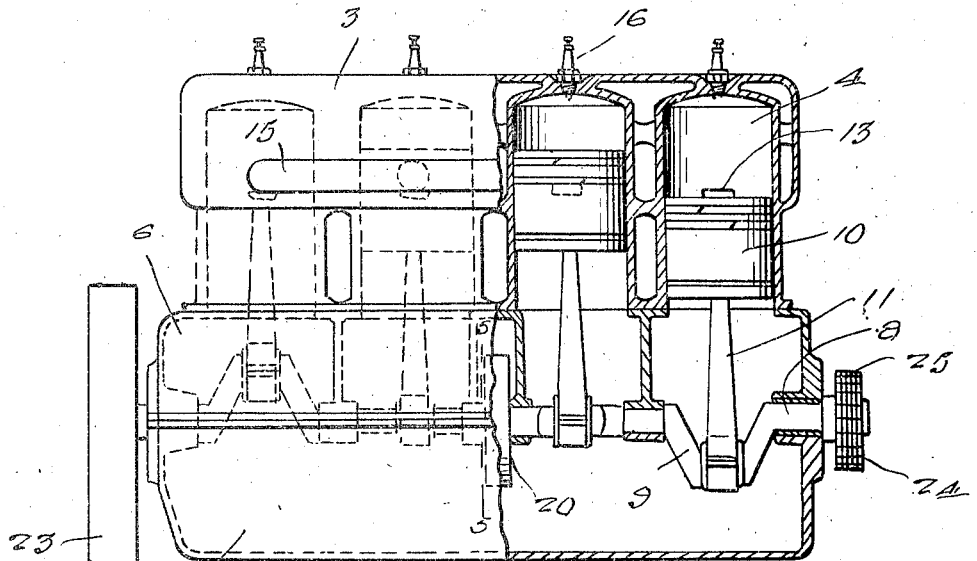
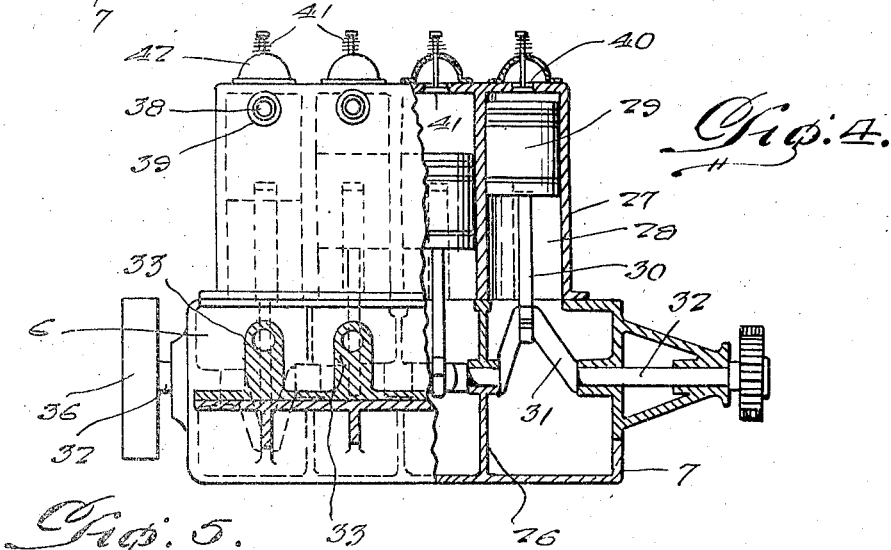
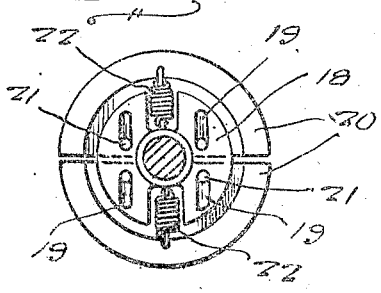

1,621,634

UNITED STATES PATENT OFFICE.

HENRY R. JONES, OF BEDFORD, VIRGINIA, ASSIGNOR OF ONE-THIRD TO WILLIAM F. HURT AND ONE-THIRD TO NELSON SALE, BOTH OF BEDFORD, VIRGINIA.

INTERNAL-COMBUSTION ENGINE.

Application filed January 11, 1926. Serial No. 80,675.

This invention relates to improvements in internal combustion engines of the type wherein a separate charging unit is employed for mixing and compressing the fuel charge for the engine prior to its intake in the cylinder and in which the motor may be constructed in either the two or four cycle type.

An object of the invention resides in providing an internal combustion engine with a compressor unit adapted to separately compress an initial charge of air and gas and subsequently commingle the compressed charges of air and gas and then further compress the commingled charge for supply to the power cylinder of the engine at the proper point in the cycle of operation.

A further object of the invention resides in providing a charger unit mounted on an internal combustion engine of either the two or four cycle type, in which the charger provides preliminary compression of air and has in separate compartments subsequently commingling charges for supply to the internal combustion engine, the internal combustion piston serving to control the passage from the charger to the power cylinder in a predetermined manner.

The invention further comprehends the provision of an internal combustion engine having a separate charger unit which is associated with the internal combustion engine in such a manner that the charge of air for one portion of the charger is taken from the crank case of the engine so that in addition to cooling the lubricating fluid in the engine crank case, the air will be preliminarily heated and then separately compressed from the charge of gaseous mixture substantially simultaneous with the intake of said mixture so that a piston control passage in the charger unit will permit the compressed air charge to be commingled with the charge of gaseous fuel which is subsequently compressed by the charger unit to supply a highly compressed and intermixed charge of fuel mixture which is pre-heated to the power cylinder of the engine.

The invention comprehends numerous other objects and improvements in the construction and arrangement of the parts for carrying out the invention, which are more particularly pointed out in the following detailed description and in the claims directed to a preferred form of the invention, it being understood however, that various changes may be made in the size, shape and arrangement of the parts without departing from the spirit and scope of the invention as herein set forth.

In the drawings forming part of this application:

Figure 1 is a plan view of the improved internal combustion engine, with the charger unit attached thereto.

Fig. 2 is a vertical transverse sectional view taken on line 2—2 of Fig. 1.

Fig. 3 is a side elevation of the internal combustion engine, of the side opposite to the charging unit in which a portion is broken away as shown in longitudinal section to illustrate the details of construction of the pistons and cylinders.

Fig. 4 is a sectional view taken on line 4—4 of Fig. 2.

Fig. 5 is a sectional view taken on line 5—5 of Fig. 3.

Fig. 6 is a diagrammatic view similar to Fig. 2, in which the pistons and crank shaft is shown at the diametrically opposite point of rotation from that shown in Fig. 2 in order to illustrate the cycle of operation in conjunction with Fig. 2 of the improved engine.

1 indicates the main assembly of the internal combustion engine, and 2 the charger unit mounted thereon at one side.

The internal combustion engine includes a cylinder block 3 formed with a plurality of cylinders 4 surrounded in the usual manner by a water jacket 5. The cylinder block 3 is mounted as usual on the upper edge of the upper crank case section 6 as clearly shown in Fig. 2, which is in turn assembled with the lower crank case section 7. This upper crank section 6 is provided with a multi-bearing support for rotatably mounting the crank shaft 8 having a plurality of cranks 9 corresponding with the number of cylinders. A four cylinder motor is illustrated and the cranks are shown in 90° relation so that in a two cycle type of motor, a power impulse is applied to the crank shaft at every quarter revolution thereof. The pistons 10 are of any desired type as used in two cycle internal combustion engines and have the connecting rods 11 connecting them with the cranks 9 of the crank shaft in the usual and well known manner. At one side of each cylinder the cylinder block is formed with an exhaust port 12 which is positioned adjacent the lower end of the stroke of movement of the piston 10, while at diametrically opposite points of each cylinder are the intake ports 13 which are substantially narrow with respect to the exhaust ports 12 and the lower edges of which are in the same plane. In this way, the exhaust port will open at the lower end of each stroke of the piston 10 to permit the exhaust prior to the intake of a new charge.

The pistons 10 are provided with projections 14 in order to direct the new fuel charge upwardly into the cylinders 4 in such a manner as to completely scavenge the cylinder.

An exhaust manifold 15 is mounted on the side of the engine block 3 and conducts the exhaust from each cylinder 4 outwardly through and to a suitable exhaust pipe. Spark plugs or sparking devices 16 are mounted in the upper end of each cylinder 4 in the cylinder block 3 and attached to a suitably timed ignition system for properly timing and controlling the engine. The upper crank case section 6 is provided with the usual breather tube 17 which provides an oral filling neck for the crank case as well as providing an air intake port for the charger unit.

A balancer is used on the crank shaft 8 of the engine and is mounted between the central bearing and cylinders thereof as clearly shown in Fig. 3, the same including a pair of disks 18 mounted in spaced relation on the crank shaft and formed with suitable slots 19. Segmental balancing elements 20 are slidably mounted between the plates 18 having projections 21 extending into the slots 19 for guiding the sliding movement of the elements and limiting their outward movement from the crank shaft. Suitable coiled springs 22 normally operate to retain the balancing elements adjacent the crank shaft while the centrifugal force in the rotation in the crank shaft causes these elements to move outwardly in the slots 19 to increase the balancing action thereof and increase speed of the crank shaft in direct proportion to the speed.

The fly wheel 23 is mounted on the forward end of the crank shaft while the rear end extends outwardly from the crank case for connection with suitable driven apparatus and also mounts a sprocket 24 for driving the charger unit through the silent chain 25 in a manner which will be presently described.

The charger unit is mounted by the internal combustion engine and for this purpose the upper and lower crank case sections 7 have the crank case of this charger unit formed integral therewith, as clearly shown in Fig. 2, but independent of the crank case of the internal combustion engine, and divided into a plurality of compartments by the partition 26. The charger unit includes a separate cylinder block 27 which is mounted on the upper crank case section 6 at one side of the internal combustion engine, and which includes a plurality of cylinders 28 corresponding in number to the number of cylinders in the internal combustion engine. Pistons 29 are operable in each of these cylinders, and attached by the connecting rods 30 to the cranks 31 of the charger crank shaft 32, which is provided with suitable bearings at a plurality of points between each of the cranks in the upper crank case section 6.

The upper crank case section 6 is formed with a plurality of transversely extending webs 33 as shown in Fig. 4, between the portions thereof forming the crank case for the internal combustion engine and the charger units which are adapted to reinforce and form stress reducing sections between the crank case for the engine and the charger unit and are provided with passages 34 providing communication with each of the chambers in the charger crank case and the crank case of the internal combustion engine.

A suitably operated valve 35 is mounted in the passages 34 and serves to permit flow in one direction only through said passages from the crank case of the internal combustion engine to each separate chamber of the crank case for the charger unit in a manner which will be presently pointed out. The crank shaft 32 of the charger unit is provided with a fly wheel at 36 on the forward end, while its rear end is mounted on the chain sprocket 37 receiving the silent chain 25 by which the crank shaft 32 is driven from the main crank shaft 8 of the internal combustion engine in the proper timed relation with the crank shaft of the internal combustion engine in order to produce proper cycle of operation thereof.

Each of the cylinders 28 of the charger unit are formed with outlet ports 38 which communicate with intake manifolds 39 connecting these ports with the intake ports 13 of the internal combustion engine in a manner as clearly shown in Figs. 1 and 2. The top portion of the cylinder block 27 is formed with an inlet port 40 controlled by the spring operated valve 41 which permits flow into the cylinders 28 but prevents a backflow 40 through. A manifold 42 is connected to the upper end of the cylinder block 27 of the charger unit and in turn receives the pipe connection 43 which mounts the carbureting device 44 which may be of any suitable and desired design found best adaptable for the purpose.

The cylinder block 27 is also formed at one side with a plurality of passages 45 providing communication between the cylinders 28 and the chambers in the crank case of the charger unit so that the air compressed in the crank case chambers of the charger unit is communicated to the cylinders 28 above the pistons, when the pistons 29 are in their lower limit of movement as shown in Fig. 6.

The construction shown is particularly adapted to provide a two-cycle internal combustion engine having four cylinders in which the charger unit has a separate cylinder for charging each corresponding cylinder of the internal combustion engine in the proper timed relation therewith. In operation, the charger in the downward stroke of the piston from the position shown in Fig. 2, compresses the charge of air in the crank case which has been previously taken in through the breather pipe 17, the crank case of the motor and through the passage 34 past the valve 35. It simultaneously draws in a charge of fuel mixture from the carbureting device 44 through the pipe connection 43, the manifold 42 and past the valve 41 in the port 40 and into the upper end of the cylinder 28. The piston 29 controls the by-pass 45 in the charger so that it is normally closed and when the piston reaches the lower limit of its stroke of movement, which is the position shown in Fig. 6, it uncovers the end of the passage 45 and permits the compressed air in the crank case chamber of the charger unit to pass into the cylinder 28 above the piston and commingle with the charge of fuel drawn into this portion of the cylinder.

This provides for a substantial intermixing of fuel charge with the air at a pressure considerably above atmospheric pressure and in addition supplies any fuel vapor obtained from the oil in the crank case of the motor with this charge of compressed air to the fuel mixture. This provides an efficient fuel mixture which is then further compressed in the upstroke of the piston from the position shown in Fig. 6 to the position of Fig. 2, so that in the position of the parts as in Fig. 2, this highly compressed charge will be forced through the intake manifold 39 through the intake 13 of the motor, into the cylinder 4, and will be directly upwardly so as to completely scavenge the cylinder of the remaining exhaust gas and provide a substantially well mixed pre-heated charge of fuel vapors to the cylinder 4. In the next portion of the movement of the two crank shafts, the piston 10 will be moved upwardly to close the inlet and exhaust ports 12 and 13, while the piston 29 will close the by-pass 45, and in the normal operation of the engine the charge in the cylinder 4 will be substantially higher than normal atmospheric pressure in view of the extra compressed volume of gas supplied to the cylinder 4 by the charger unit.

The pre-heating of the gaseous mixture is effected through the heating of the air in the crank case of the engine as well as the generation of heat during the triple compression of the air and mixture in the charger unit and the engine before the firing thereof. The number of parts are reduced to a minimum by providing control ports in the construction of this two cylinder engine so that a highly intermixed and compressed gaseous charge is supplied to the engine at the lower movement of limit to the piston.

The engine, in operating on a two cycle principle fires at the upper end of the movement of each piston, so that each downward stroke of the piston will provide a power stroke for the engine. In this way, a two stroke cycle engine is provided having all of the advantages of a four cycle engine, and in which double the number of power impulses are applied to the main crank shaft 8. No gaseous fuel mixture is compressed or passed through the crank case of the engine so that the usual type of lubrication system as now used in four cycle engines may be used with this engine to sufficiently lubricate the entire operative mechanism of the engine in the same manner as will a four cylinder engine, and thereby produce a two cycle motor having the operating life of the ordinary four cycle motor.

A further advantage is obtained in drawing all of the gases from the crank case of the motor into the charger unit so as to prevent leakage past the piston 10 from diluting the lubricant in the crank case, and at the same time utilizing this leakage for its fuel value in operating the motor.

It will thus be seen that an internal combustion engine of the two cycle type has been provided which includes substantially all of the advantages of the ordinary four cycle motor, and develops a considerably greater and smoother amount of power than similar types of engines of its proportionate size.

It is to be further understood that the charger unit may be constructed with a four cycle motor for charging the cylinders in the usual manner through the use of suitable intake and exhaust valves properly adjusted to time the operation of the intake and exhaust with the motor, and in which conjunction this charger unit in providing double compression of the air and mixture before supplying it to the engine will not only supply a more thoroughly mixed charge of combustible fuel, but a larger volume by reason of charging the engine cylinders with a charge under compression. So that with this construction applied to a four cycle engine of similar character to that shown in the drawing a greater production of power for the same amount of fuel can be provided which will give the engine all of the above-mentioned advantages.

Having thus described my invention, what I claim as new is:—

1. An internal combustion engine, comprising an engine unit, and a charger unit, said units having independent cylinder blocks formed with a cylinder, and sectional crank case forming members formed integral for both units and providing separate crank case chambers, a breather passage for the engine crank case, a valve passage between the engine crank case and the charger crank case chamber, pistons reciprocable in the engine and charger unit cylinders in timed relation, intake and exhaust passages controlled in a predetermined manner and communicating with the charger and engine unit cylinders, the exhaust passage of the charger unit having communication with the inlet passage of the engine unit, and a by-pass between the crank case chamber and the cylinder of the charger unit.

2. In an internal combustion engine, an engine unit having a working cylinder and a working piston, a charger unit having a double acting cylinder adjacent said working cylinder, a passage establishing communication between said cylinders for admitting a working mixture to the working cylinder from the charger cylinder, an exhaust from the working cylinder controlled in a predetermined manner, a double acting piston in the charger cylinder, a valved air inlet to the charger cylinder at one side of said piston, a valved fuel mixture inlet communicating with the cylinder at the opposite side of the piston, a by-pass in the charger cylinder to permit passage of air from the first mentioned side of the piston to the last mentioned side thereof, and means for operating said piston in timed relation, whereby in one stroke of the charger piston, a charge of air will be drawn into one end of the charger cylinder and a charge of fuel and compressed air will be intermixed and compressed in the other end of said charger cylinder and supplied at the end of the stroke of the piston to the working cylinder, and in the opposite stroke of said charger piston the charge of air in the first named end of the charger cylinder will be compressed, while a charge of fuel mixture will be drawn into the last named end of said charger cylinder, and at the end of this stroke of the piston will uncover the by-pass to permit a charge of compressed air to enter the opposite end of the cylinder for intermixture under pressure with the fuel mixture therein.

3. An internal combustion engine comprising a working cylinder and piston, means operable in timed relation with said working piston for providing a predetermined charge of fuel mixture, compressing a preliminary air charge, mixing the compressed air charge with the fuel mixture to provide an intermixture at a pressure higher than the fuel mixture, and for subsequently compressing the last mixture, means for supplying the last mentioned compressed mixture to the working cylinder, and means for operating the working piston to compress the mixture supplied thereto in one stroke for combustion at the end of said stroke.

In testimony whereof I affix my signature.

HENRY R. JONES.